2,889,328

N (2 SUBSTITUTED THIO PHENYL) N PHENYL, ALKYLENE DIAMINES

Margaret Sherlock and Nathan Sperber, Bloomfield, and Domenick Papa, Glen Ridge, N.J., assignors to Schering Corporation, Bloomfield, N.J., a corporation of New Jersey No Drawing. Application January 19, 1956
Serial No. 560,083

17 Claims. (Cl. 260—268)

This invention relates to a new group of chemical compounds which possess important therapeutic properties and to processes for their manufacture. More particularly, this invention relates to new and useful N-substituted thiodiphenylamines which have therapeutic utility per se or are useful in the conversion to therapeutically active substances.

The compounds of our invention are represented by the following general Formula I and include the non-toxic acid addition salts thereof:

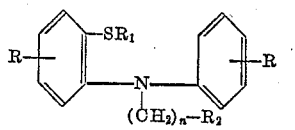

wherein R is a member of the group consisting of H, halogen, lower alkyloxy or lower alkyl, $R_1$ is a member of the group consisting of H, lower alkyl, aralkyl or aryl, $R_2$ is a member of the group consisting of lower dialkylamino, pyrrolidino, piperidino, morpholino, and piperazino, and $n$ is an integer from 2 to 4. Representative members of the moieties included in the definition of R are exemplified by chlorine, bromine, iodine, methoxy, ethoxy, methyl, ethyl and the like. Similarly falling within the definition of $R_1$ are lower alkyls such as methyl, ethyl, butyl; aralkyl groupings such as benzyl and aryl groups such as phenyl which may or may not be substituted. Where $R_2$ is piperazino, we include within our invention such radicals as 4-alkylpiperazino, 4-hydroxyalkylpiperazino and 4-oxyalkoxyalkylpiperazino. Specific examples of the foregoing are 4-methylpiperazino, 4-ethylpiperazino, 4-($\beta$-hydroxyethyl)-piperazino, 4-[$\beta$-($\beta'$-hydroxyethoxy)-ethyl]-piperazino, 4-[$\beta$-($\beta'$-ethoxyethoxy)-ethyl]-piperazino and the like.

We have found that the compounds of the general formula possess certain important physiological properties which are useful in chemopsychotherapeutic applications. These compounds manifest themselves by exerting a calming and a quieting effect, thereby lending themselves to application to neuropsychiatric patients in particular. Thus, in their ability to tranquilize severely disturbed patients such as those in mental institutions, the restlessness and hyperactivity of the patient are relieved, permitting an improvement in appetite and sleeping habits. Furthermore, along with their general tranquilizing properties, these compounds are useful in allaying anxiety and tension which arise from a myriad of sources such as gynecologic disorders, dermatologic conditions, etc.

In addition, the compounds of our invention may be administered as anti-emetics in the treatment of nausea and vomiting. The mechanism by which this action occurs is not completely known, but we believe that the compounds exert a depressant effect on the central nervous system and on the medulla, thus inhibiting the vomiting center and preventing or stopping emesis.

In addition to the important applications of the compounds cited above, our new substances exhibit antihistaminic action and are useful in the treatment of allergic disorders of both a local and systemic nature.

Since for the most part, compounds of the general formula are insoluble in aqueous media, they are preferably administered in the form of a soluble non-toxic acid addition salt such as hydrochloride, maleate, tartrate, citrate and the like. The preferred mode of administration is oral by means of tablets or elixirs in conjunction with suitable carriers and other types of pharmaceutical dosage units which lend themselves to such administration. In certain instances where parenteral administration is indicated, the compound in the form of non-toxic acid addition salt is prepared in sterile solutions or suspensions.

Depending upon the treatment and the indication, the compounds of our invention may be administered in doses ranging from 10 to 150 mg. per day, although doses as high as 250 mg. may be used in severe cases.

The compounds of our invention may be prepared by alkylation of an o-methylthiodiphenylamine with a substituted alkyl halide such as dimethylaminopropyl chloride, piperidinoethyl chloride and the like. We prefer to prepare the o-alkylthiodiphenylamines according to the following sequence of reactions:

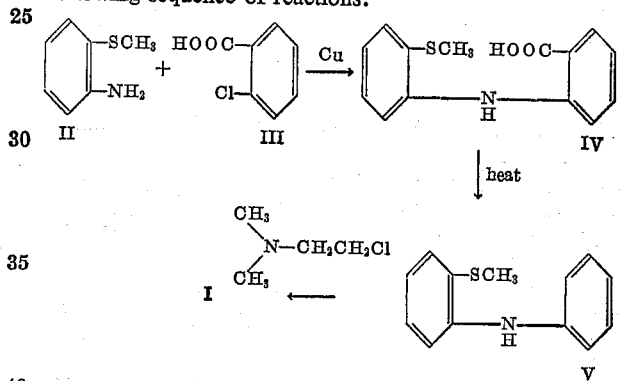

In the foregoing reaction scheme a thioaniline such as o-methylthioaniline (II) is reacted with an o-halogenated benzoic acid salt such as potassium o-chlorobenzoate (III) in the presence of copper powder. The carboxydiphenylamine (IV) is easily decarboxylated by heating, thereby generating the alkylthiodiphenylamine, V. Alklation of V as indicated with dimethylaminoethyl chloride in the presence of sodamide gives rise to a compound falling within the general Formula I.

The foregoing reaction sequence may be applied generally for the preparation of thiodiphenylamines which possess a substituent in either or both rings. For example, in place of III, there may be used a salt of 2,4-dichlorobenzoic acid, ultimately yielding after decarboxylation o-methylthio-m'-chlorodiphenylamine.

Alternatively, the substituent, such as chloro, may be present in the starting thioaniline as is exemplified by 2-methylthio-5-chloroaniline (which is obtained by methylation of the corresponding benzenethiol with dimethylsulfate). The ultimate product obtained with this intermediate is 2-methylthio-5-chlorodiphenylamine.

The alkylation of the diphenylamine may be carried out in a variety of ways in addition to the well-known utilization of a dialkylaminoalkyl halide in the presence of a basic condensing agent such as sodamide. The alkylation may be carried out in two steps such as by alkylating the o-alkylthiodiphenylamine with 1-bromo-3-chloropropane in an inert solvent in the presence of an agent such as sodamide, potassium amide, lithium amide and the like. The intermediary $\omega$-chloroalkyl compound is further reacted with a secondary amine such as dimethylamine, pyrrolidine, piperidine, piperazine, morpholine and the like, giving rise to compounds having the configuration shown in general Formula I. For clarification, this alternative method of alkylation by a two step process is indicated below:

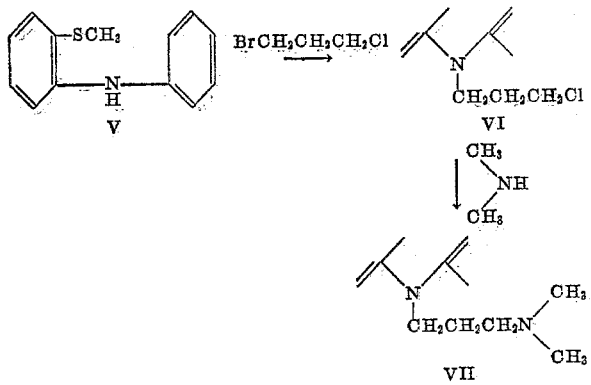

Salts of the free base of our invention may be prepared by methods described in the literature. For example, bubbling anhydrous hydrogen chloride into an ether solution of the free base causes immediate precipitation of the corresponding hydrochloride which may be recrystallized from alcohol-ether mixtures. Other salts such as the maleate are prepared by mixing equal molecular quantities of the free base and the carboxylic acid in a solvent such as ethyl acetate or isopropyl acetate and forcing crystallization either by concentration or dilution with a second solvent in which the salt is insoluble.

EXAMPLE 1

N-($\gamma$-dimethylaminopropyl)-2-methylthiodiphenylamine

The requisite intermediate, N-(o-methylthiophenyl)-anthranilic acid is prepared in the following manner: A mixture of 42.8 g. of o-methylthioaniline, 62 g. of potassium o-chlorobenzoate and 3 g. of copper powder in 150 ml. of n-amyl alcohol is stirred and heated at reflux for six hours. The reaction mixture is made alkaline with sodium bicarbonate solution and steam distilled to remove the amyl alcohol. The residue is cooled and thoroughly extracted with ether. The basic aqueous layer is acidified with dilute acetic acid and the precipitate so formed is removed by filtration. Recrystallization from benzene yields N-(o-methylthiophenyl)-anthranilic acid, M.P. 184–185°.

Decarboxylation of the anthranilic acid obtained above is effected by heating 32.5 g. of the acid at 240–260° for one to two hours. The residual oil is distilled affording 2-methylthiodiphenylamine, B.P. 151–155°/0.5 mm.

To a suspension of sodamide (from 1.88 g. of sodium) in 300 ml. of liquid ammonia, there is added 17.3 g. of 2-methylthiodiphenylamine. After stirring for twenty minutes, 9.8 g. of $\gamma$-dimethylaminopropyl chloride is added, followed by the slow addition of 200 ml. of anhydrous toluene. The ammonia is allowed to evaporate and the reaction mixture is refluxed and stirred for eight hours. The mixture is decomposed with water and the toluene layer extracted with dilute hydrochloric acid. The aqueous layer is made alkaline with 50° sodium hydroxide solution and the oily layer which separates is extracted with ether. The ether extracts are dried over anhydrous sodium sulfate, concentrated and the residual oil distilled yielding N-($\gamma$-dimethylaminopropyl)-2-methylthiodiphenylamine, B.P. 184–185° (0.5 mm.).

Alternatively, the following alkylation procedure may be employed: To a suspension of sodamide (from 2.3 g. of sodium) and 300 ml. of liquid ammonia ether is added 21.5 g. of o-methylthiodiphenylamine. After stirring for 30 minutes, 16 g. of 1-chloro-3-bromopropane is added dropwise. When the ammonia has evaporated, 200 ml. of water is added and the separated oil is extracted with ether. The ether extracts are dried over anhydrous sodium sulfate and concentrated. The crude residue, N-($\gamma$-chloropropyl)-2-methylthiodiphenylamine is heated in a sealed tube with an excess of dimethylamine at 100–120° for 4–6 hours. The crude reaction mixture is treated with dilute hydrochloric acid solution and extracted with ether. The acid layer is basified with sodium hydroxide solution and the resulting oil is extracted with ether. The ether extracts are dried, concentrated and the residue fractionally distilled, yielding the compound of this example.

EXAMPLE 2

N-($\gamma$-dimethylaminopropyl)-2-methylthiodiphenylamine monohydrochloride

A solution of 1 g. of the free base obtained in Example 1 in 3 ml. of anhydrous ethanol is treated with 5 ml. of a saturated solution of hydrogen chloride in anhydrous ethanol. Upon cooling, the hydrochloride of this example is obtained and is purified by recrystallization from ethanol, M.P. 205–207°.

EXAMPLE 3

N-($\gamma$-dimethylaminopropyl)-2-methylthio-3'-chlorodiphenylamine

The requisite intermediate, N-(o-methylthiophenyl)-4-chloroanthranilic acid is prepared from the reaction of 32.9 g. of o-methylthioaniline, 55.9 g. of the potassium salt of 2,4-dichlorobenzoic acid, 2.3 g. of copper powder and 130 ml. of n-amyl alcohol according to the procedure in Example 1. The acid is obtained as yellow crystals, M.P. 212–214°, after recrystallization from ethyl acetate.

Decarboxylation of 28 g. of N-(o-methylthiophenyl)-4-chloroanthranilic acid at 240–260° for three and one-half hours and distillation of the residue yields a yellow oil, 2-methylthio-3'-chlorodiphenylamine, B.P. 146–148° (0.05 mm.).

By the method of Example 1, 13.0 g. of 2-methylthio-3'-chlorodiphenylamine is alkylated with sodamide (from 1.27 g. of sodium) and 8 g. of $\gamma$-dimethylaminopropyl chloride yielding N-($\gamma$-dimethylaminopropyl)-2-methylthio-3'-chlorodiphenylamine, B.P. 202–204°/0.5 mm.

A hydrochloride prepared as described in Example 2 melts at 176–177°.

When a solution of the free base in anhydrous ether is treated with gaseous methyl bromide for three hours, N - ($\gamma$ - dimethylaminopropyl) - 2 - methylthio - 3'-chlorodiphenylamine methyl bromide is obtained. The white, crystalline quaternary is recrystallized from absolute ethanol, M.P. 182–183°.

EXAMPLE 4

N-($\gamma$-pyrrolidinopropyl)-2-methylthio-5-chlorodiphenylamine

The requisite intermediate, 2-methylthio-5-chloroaniline is prepared as follows: To a solution of 63.8 g. of 4-chloro-2-aminothiophenol in 100 ml. of water containing 16 g. of sodium hydroxide there is added over a period of one hour, 52 g. of dimethyl sulfate, keeping the reaction temperature below 50°. After stirring for one hour, the reaction mixture is made alkaline with 10% sodium hydroxide and extracted with ether. The ether extracts are dried over anhydrous sodium sulfate, concentrated and the residual oil is distilled, yielding the thiochloroaniline, B.P. 124–126°/8.0 mm.

A mixture of 26.5 g. of 2-methylthio-5-chloroaniline, 31 g. of the potassium salt of o-chlorobenzoic acid and 1.5 g. of copper powder is reacted as in Example 1. The crude acid, 2-methylthio-5-chloro-2'-carboxydiphenylamine is obtained as a pale yellow powder.

Decarboxylation of the crude 2-methylthio-5-chloro-2'-carboxydiphenylamine at 240–260° as in Example 1 affords 2-methylthio-5-chlorodiphenylamine as a yellow oil, B.P. 150–154°/1.0 mm.

Alkylation of 20 g. of 2-methylthio-5-chlorodiphenylamine with sodamide (from 1.88 g. of sodium) and 12 g. of γ-pyrrolidinopropyl chloride as in Example 1 yields N - (γ - pyrrolidinopropyl) - 2 - methylthio - 5 - chlorodiphenylamine as a viscous yellow oil, B.P. 218–222°/0.5 mm.

EXAMPLE 5

N-(β-diethylaminoethyl)-2-methylthiodiphenylamine

By the alkylation of 17.3 g. of 2-methylthiodiphenylamine with sodamide (from 1.88 g. of sodium) and 11 g. of β-diethylaminoethyl chloride in the manner described in Example 1, there is obtained N-(β-diethylaminoethyl)-2-methylthiodiphenylamine, B.P. 171–172°/1.0 mm.

EXAMPLE 6

N-(γ-piperidinopropyl)-2-methylthio-3'-chlorodiphenylamine

By the alkylation of 26 g. of 2-methylthio-3'-chlorodiphenylamine with sodamide (from 2.5 g. of sodium) and 22.5 g. of γ-piperidinopropyl chloride yields the compound of this example as a viscous yellow oil, B.P. 240–242°/0.5 mm.

EXAMPLE 7

N-(β-dimethylaminopropyl)-2-methylthio-5-chlorodiphenylamine

By the alkylation of 20 g. of 2-methylthio-5-chlorodiphenylamine with 9.8 g. of β-dimethylaminopropyl chloride in the presence of sodamide prepared from 2.1 g. of sodium as in Example 1. There is obtained N-(β-dimethylaminopropyl) - 2 - methylthio - 5 - chlorodiphenylamine as a viscous yellow oil, B.P. 207–212°/1.0 mm.

EXAMPLE 8

N-(γ-dipropylaminopropyl)-2-benzylthio-5-bromodiphenylamine

The intermediate 2-benzylthio-5-bromodiphenylamine is prepared as follows: A mixture of 30 g. of 2-benzylthio-5-bromoaniline, 21 g. of the potassium salt of o-chlorobenzoic acid and 1 g. of copper powder are refluxed in 100 ml. of n-amyl alcohol as in Example 1. The crude N-(2-benzylthio-5-bromophenyl)anthranilic acid so obtained is decarboxylated by heating at 240–260° for three hours and the residual oil distilled in vacuo yielding 2-benzylthio-5-bromodiphenylamine, B.P. 168–172°/0.5 mm.

The alkylation of 30 g. of 2-benzylthio-5-bromodiphenylamine with sodamide (from 1.88 g. of sodium) and 14.5 g. of n-dipropylaminopropyl chloride as analogously described in Example 1 yields N-(γ-dipropylaminopropyl)-2-benzylthio-5-bromo diphenylamine as a yellow, viscous oil, B.P. 230–232°/0.5 mm.

EXAMPLE 9

N-(β-pyrrolidinoethyl)-2-methylthio-4-methoxydiphenylamine

A solution of 31 g. of 2-amino-5-methoxythiophenol in 50 ml. of water containing 8 g. of sodium hydroxide is treated with 26 g. of dimethyl sulfate as in Example 4, yielding 2-methylthio-4-methoxyaniline as a light yellow oil; B.P. 130–132°/6.0 mm.

A mixture of 26 g. of 2-methylthio-4-methoxyaniline, 31 g. of the potassium salt of o-chlorobenzoic acid and 1.5 g. of copper powder is reacted and worked up as in Example 1. Decarboxylation of the crude N-(2-methylthio-4-methoxyphenyl)anthranilic acid so obtained yields 2-methylthio-4-methoxydiphenylamine; B.P. 150–153°/0.05 mm.

The alkylation of 19.5 g. of 2-methylthio-4-methoxydiphenylamine with sodamide (from 1.88 g. of sodium) and 11 g. of β-pyrrolidinoethyl chloride as in Example 1 affords N-(β-pyrrolidinoethyl)-2-methylthio-4-methoxydiphenylamine; B.P. 195–198°/0.5 mm.

EXAMPLE 10

N-(Δ-dimethylaminobutyl)-2-phenylthiodiphenylamine

From 31 g. of 2-phenylthioaniline, 31 g. of the potassium salt of o-chlorobenzoic acid and 1.5 g. of copper powder as in Example 1 affords crude N-(2-phenylthiophenyl) anthranilic acid which is decarboxylated yielding 2-phenylthiodiphenylamine, B.P. 165–168°/0.05 mm.

Alkylation of 22 g. of 2-phenylthiodiphenylamine with sodamide (from 1.88 g. of sodium) and 11 g. of Δ-dimethylaminobutyl chloride as previously described yields N - (Δ-dimethylaminobutyl)-2-phenylthiodiphenylamine; B.P. 207–210°/1.0 mm.

EXAMPLE 11

N-(γ-dimethylaminopropyl)-2-mercaptodiphenylamine

To a solution of 15 g. of N-(γ-dimethylaminopropyl)-2-methylthiodiphenylamine in 200 ml. of liquid ammonia is added 2.5 g. of freshly cut sodium. After the ammonia has evaporated, water is added cautiously. The mixture is made strongly alkaline with sodium hydroxide, in the cold, and extracted with ether. The aqueous alkaline layer is neutralized with acetic acid, the separated oil is extracted with ether. The ether extracts are concentrated under an atmosphere of nitrogen. The residual oil is distilled in vacuo in an atmosphere of nitrogen yielding the mercapto intermediate, B.P. 178–180°/0.05 mm.

EXAMPLE 12

N-(γ-dimethylaminopropyl)-2-methylthio-3'-methyldiphenylamine

The requisite intermediate N-(o-methylthiophenyl)-4-methylanthranilic acid is prepared from the reaction of 32.9 g. of o-methylthioaniline, 51 g. of the potassium salt of 2-chloro-4-methylbenzoic acid and 2.3 g. of copper powder according to the procedure in Example 1. The crude acid thus obtained is decarboxylated at 240–260° for three hours and distillation of the residue yields a yellow oil, 2-methylthio-3'-methyldiphenylamine, B.P. 142–145°/1.0 mm.

By the method of Example 1, 12.0 g. of 2-methylthio-3'-methyldiphenylamine is alkylated with sodamide (from 1.27 g. of sodium) and 8 g. of γ-dimethylaminopropyl chloride yielding N-(γ-dimethylaminopropyl)-2-methylthio-3'-methyldiphenylamine, B. P. 198–201°/1.0 mm.

When a solution of 3.14 g. of the free base in 25 ml. ethyl acetate is treated with a hot solution of 1.2 g. of maleic acid in 25 ml. of ethyl acetate, a quantitative yield of the maleate is obtained which is purified by recrystallization from ethyl acetate.

EXAMPLE 13

N-γ[4-(β-hydroxyethyl)-piperazino]-propyl-2-methylthio-3'-chlorodiphenylamine

To a suspension of sodamide (from 3 g. of sodium) in 300 ml. of liquid ammonia, there is added 31 g. of 2-methylthio-3'-chlorodiphenylamine. After stirring for one hour, 19 g. of 1-bromo-3-chloropropane is added. The ammonia is allowed to evaporate and to the residue there is then added 200 ml. of water. The oily layer which separates is extracted with ether. The ether extracts are dried over anhydrous sodium sulfate, filtered and concentrated. N-(γ-chloropropyl)-2-methylthio-3'-chlorodiphenylamine is obtained in the form of a crude oil.

A mixture of 25 g. of 4-(β-hydroxyethyl)-piperazine and 16 g. of the crude N-(γ-chloropropyl)-2-methylthio-3'-chlorodiphenylamine obtained above is heated for 18 hours on a steam bath. The mixture is decomposed by the addition of 200 ml. of water and the aqueous mixture is extracted several times with ether. The ether layer is then extracted with dilute hydrochloric acid. The acid layer is basified with sodium hydroxide solution and the resulting oil is extracted with ether. The ether extracts are dried, concentrated and the residue distilled, yielding the product of this example, an oil having a B.P. of 255–260° (1.0 mm.).

We claim:
1. Compounds selected from the group consisting of the free bases of the following formula and the non-toxic acid addition salts thereof:

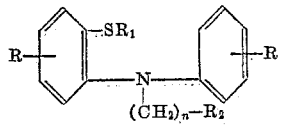

wherein R is a member of the group consisting of H, halogen, lower alkyl and lower alkyloxy; $R_1$ is selected from the group consisting of H, lower aliphatic alkyl, phenyl and benzyl; $R_2$ is an amino group selected from the class consisting of lower dialkylamino, pyrrolidino, piperidino, morpholino, and piperazino and $n$ is an integer from 2 to 4.

2. N-(γ-dimethylaminopropyl)-2-methylthio-3'-chlorodiphenylamine.
3. N-(γ-pyrrolidinopropyl)-2-methylthio-5-chlorodiphenylamine.
4. N-(β-diethylaminoethyl)-2-methylthiodiphenylamine.
5. N-(β-dimethylaminopropyl)-2-methylthio-5-chlorodiphenylamine.
6. N-(γ-dipropylaminopropyl)-2-benzylthio-5-bromodiphenylamine.
7. A process for the manufacture of a compound of the formula:

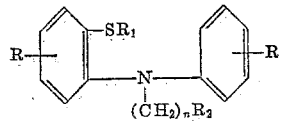

wherein R is a member of the group consisting of H, halogen, lower alkyl and lower alkyloxy; $R_1$ is a member of the group consisting of H, lower alkyl, monocyclic aryl, and monocyclic aralkyl; $R_2$ is an amino group selected from the class consisting of lower dialkylamino, pyrrolidino, piperidino, morpholino, and piperazino and $n$ is an integer from 2 to 4, which comprises condensing a diphenylamine of the formula:

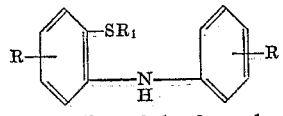

with an aminoalkyl halide of the formula:

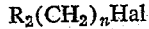

and recovering the resulting condensation product.

8. Process according to claim 7 where the condensation is carried out in the presence of a basic condensing agent.
9. Process for preparing compounds of claim 1 which comprises condensing a diphenylamine of the formula:

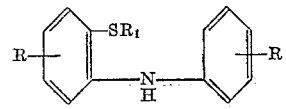

with a dihalohydrocarbon of the formula:

isolating the N-alkylated diphenylamine of the formula:

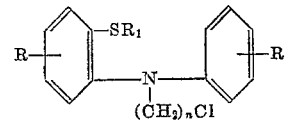

and condensing the latter with a secondary amine of the formula:

and recovering the resulting condensation product.

10. Process according to claim 9 wherein the condensations are carried out in the presence of a basic condensing agent.
11. N-(γ-dimethylaminopropyl)-2-methylthiodiphenylamine.
12. N-(γ-piperidinopropyl)-2-methylthio-3'-chlorodiphenylamine.
13. N-(β-pyrrolidinoethyl)-2-methylthio-4-methoxydiphenylamine.
14. N-γ[4-(β-hydroxyethyl)-piperazino]-propyl-2-methylthio-3'-chlorodiphenylamine.
15. N-(Δ-dimethylaminobutyl)-2-phenylthiodiphenylamine.
16. N-(γ-dimethylaminopropyl)-2-mercaptodiphenylamine.
17. N-(γ-dimethylaminopropyl)-2-methylthio-3'-methyldiphenylamine.

References Cited in the file of this patent

UNITED STATES PATENTS

| 2,642,433 | Duschinsky | June 16, 1953 |
| 2,745,837 | Papa | May 15, 1956 |

FOREIGN PATENTS

| 550,327 | Germany | Oct. 24, 1930 |

OTHER REFERENCES

King et al.: Journal of the Chemical Society (London) for 1946, pp. 5–10.